United States Patent [19]

Namekawa

[11] Patent Number: 4,821,309
[45] Date of Patent: Apr. 11, 1989

[54] METHOD OF ALARM TO PREVENT VEHICLE THEFTS

[75] Inventor: Makoto Namekawa, Iwaki, Japan

[73] Assignee: Alpine Electronics Inc., Japan

[21] Appl. No.: 881,229

[22] Filed: Jul. 2, 1986

[30] Foreign Application Priority Data

Jul. 9, 1985 [JP] Japan .................. 60-150641

[51] Int. Cl.⁴ ............................................. H04Q 7/04
[52] U.S. Cl. ..................................... 379/58; 455/343;
379/59; 379/63
[58] Field of Search .................. 379/58, 57, 59, 61–63;
340/539; 458/343

[56] References Cited

U.S. PATENT DOCUMENTS 4,558,181 12/1985 Blanchard et al. ................. 379/40
4,577,182 3/1986 Millsap et al. ...................... 340/539

FOREIGN PATENT DOCUMENTS 0077248 6/1980 Japan .

Primary Examiner—Robert Lev
Attorney, Agent, or Firm—Guy W. Shoup; Paul J. Winters; Leighton K. Chong

[57] ABSTRACT

A theft-notifying method is applicable for a motor vehicle having a motor vehicle telephone system and a theft-alarm system. The method comprises the steps for prestoring into a memory telephone numbers of a notifiee to which an alarm is sent when a theft occurs. When theft is detected, the theft-alarm system signals the theft condition to the vehicle telephone system. The vehicle telephone system then automatically dials a notifiee whose telephone number is stored in the memory. A vehicle owner is thus notified of the abnormality and take measures for the prevention of theft even at night or even when nobody is near the vehicle.

2 Claims, 3 Drawing Sheets

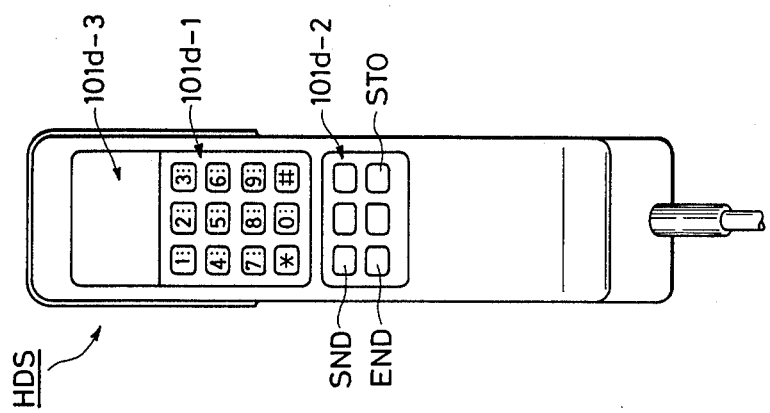
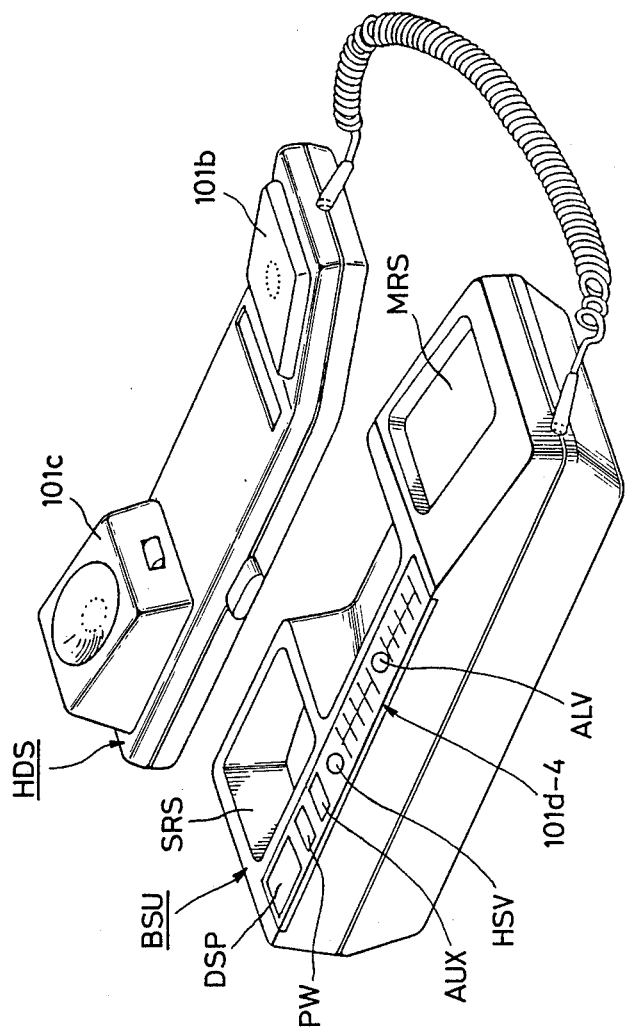

METHOD OF ALARM TO PREVENT VEHICLE THEFTS

BACKGROUND OF THE INVENTION

1. Field of the Invention

This invention relates to a method of alarm to prevent a motor vehicle from being stolen and more particularly to a method for a motor vehicle comprising a motor vehicle telephone system and a theft-alarm system.

2. Prior Art

There have been proposed various anti-theft devices. Conventional devices for preventing motor vehicles from theft proposed sounding a buzzer or flashing of the headlamp when someone other than a vehicle owner tries to open a door or upon detection of a strong shock to a vehicle. This mechanism is also operable when a trunk door is opened for theft purposes.

However, this method is effective only when someone is near the car for recognition of the perpetrator and thus does not effectively prevent the theft in case nobody is near the car or theft occurs at night.

SUMMARY OF THE INVENTION

It is therefore an object of the present invention to provide an alarm method to notify a motor vehicle owner of the occurrence of theft of his/her vehicle, thereby effectively preventing motor vehicle theft even at night or even when there is nobody near the vehicle.

Another object of the present invetion is to automatically notify the vehicle owner of the theft via the motor vehicle telephone system when a theft condition occurs in a vehicle provided with a motor vehicle telephone and a theft-alarm system.

In the theft-notifying method in accordance with the present invention, a memory is used to pre-store a telephone number of a notifiee who is notified when vehicle theft occurs. The system notifies of the detected theft via the motor vehicle telephone system. Upon reception of the notification, the telephone system automatically calls a memory-stored telephone number of a notifiee. The theft is thus notified to the notifiee even at night or even when nobody is near the vehicle.

BRIEF DESCRIPTION OF THE DRAWINGS

FIG. 2 is a perspective view of the control unit,

FIG. 3 is a plan view of the handset, and

DESCRIPTION OF THE PREFERRED EMBODIMENT

The invention will now be described with reference to the preferred embodiment of the proposed theft-notifying method.

Figure 1:
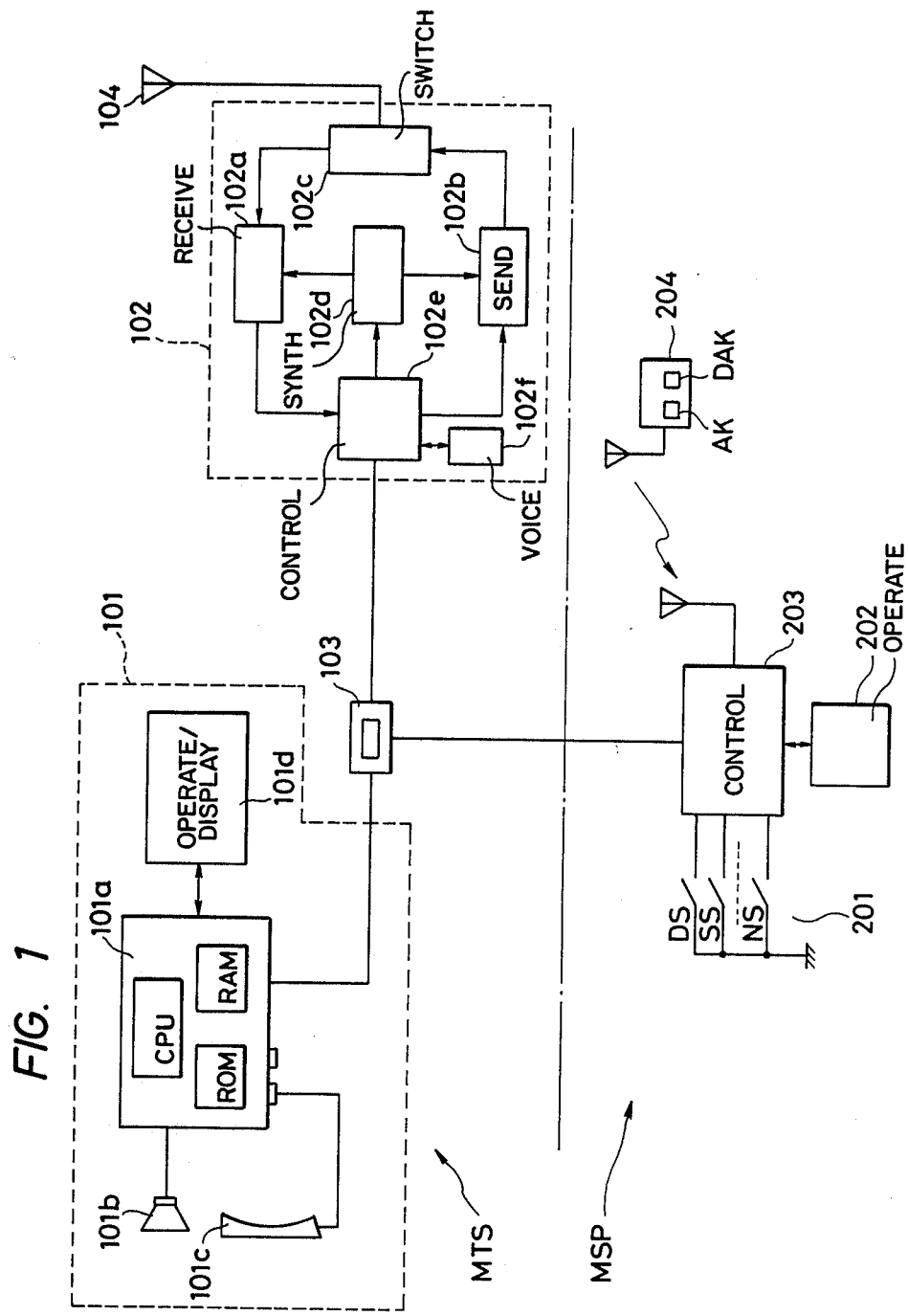
FIG. 1 is a block of the system for realizing the theft notifying method in accordance with the present invention.

FIG. 1 is a block diagram of the system for realizing the theft-notifying method in accorance with the present invention. The MTS is a motor vehicle telephone system and the MSP is an anti-theft system for motor vehicles.

The motor vehicle telephone system MTS includes a control unit 101, a transceiver unit 102, a T-connector 103, and an antenna 104.

The anti-theft system MSP includes a sensor unit 201 for detecting abnormalities relating to thefts, an operating section 202 provided with numeric and function keys, a control section 203 of a microcomputer structure, and a remote control unit 204 referred to as a pager for turning on/off the theft-preventing function.

The control unit 101 and the transceiver unit 102 are interfaced for enabling mutual communication by means of power control lines, digital data exchange lines, voice lines, etc., while the T-connector 103 provides the control section 203 of the anti-theft system MSP with some of the lines required for the system in connection with the anti-theft processing.

A memory, which is contained in the control unit 101 for example, is used to pre-store a telephone number of a notifiee to which a theft alarm is sent when theft occurs.

A driver of a motor vehicle, before leaving the vehicle, can set the system MSP to the operating state by operating the operating section 202 or the pager 204 of the system.

Under this state, when some abnormality is caused by someone attempting to steal the vehicle, the sensor section 201 detects the abnormality and notifies the control section 203 of the occurrence of the abnormality.

According to the sensor input, the control section 203 signals the occurrence of the abnormality to the control unit 101 of the motor vehicle telephone system MTS.

Upon notification of the abnormality, the control unit 101 sets the vehicle telephone system MTS to the power-on state and forwards the memory-stored telephone number. It sends a signal to the transceiver unit 102 which dials the notifiee's telephone number after establishment of the communication state.

The MTS represents the vehicle telephone system of a cellular method wherein a given service area is broken down into a plurality of cells each of which has a radius of approximately 6.4 Km and is provided with a radio station (base station). One of the base stations receiving a radio wave from a telephone in a vehicle is switched successively along with the movement of the vehicle. A communication path with the notifiee is thus established.

Again, the motor vehicle telephone system MTS comprises the control unit 101, transceiver unit 102, T-connector 103, and antenna 104. The control unit 101 includes a computerized control section 101a, speakerphone 101c, microphone 101b, and operating/display section 101d. As shown in FIG. 2, it contains mechanical arrangements of the handset HDS and the base unit BSU. On the back surface of the handset HDS are installed the microphone 101b and speakerphone 101c and on the front surface of the same are installed as shown in FIG. 3 the ten-key section 101d-1 for inputting telephone numbers etc. The function key section 101d-2 has a send key SEND, an end key END, and the display section 101d-3 for displaying a telephone number dialed.

The base unit BSU as shown in FIG. 2 comprises the panel section 101d-4, speakerphone rest section SRS, and the microphone rest section MRS. On the panel section 101d-4 are installed a power-on/off switch PW, an AUX switch, an alert volume ALV for controlling the speaker level for a ring tone, a handset volume HSV for controlling the voice volume for a handset, and a display section DSP for providing various displays. It is noted that the ten-key section 101d-1, function key section 101d-2 and display section 101d-3 contained in the handset HDS, and the panel section 101d-4 contained in the base unit BSU constitute together with the operating/display section 101-d as shown in FIG. 1.

The transceiver unit 102 includes a receive section 102a, a transmit section 102b, a switch section 102c for properly connecting an antenna 104 to the receive section or to the transmit section, a synthesizer 102d for generating a pre-determined frequency signal, control section 102e, and an alarm message output device 102f. The alarm message output device 102f is composed of a tone generator of a voice synthesizer for outputting a sound having a pre-determined tone.

The anti-theft system MSP includes a sensor section 201 for detecting thefts, an operating section 202, a control section 203 of a microcomputer structure, and a remote control unit 204 referred to as a pager for turning on/off the anti-theft function.

The sensor section 201 includes a sensor DS for detecting opening/closing doors, a shock sensor SS for detecting any shock with a magnitude greater than a predetermined level, a noise sensor NS for detecting noises inside the vehicle which exceed the pre-determined noise level, and other sensors such as the one for detecting opening/closing of a vehicle trunk.

The operating section 202 has a ten-key for inputting a password number for resetting the system alarm state in case of the occurrence of an abnormality, keys for operating the anti-theft function of the system, keys for clearing the operation of the steal-proof function, and others.

The remote control unit 204 incorporates a transmit circuit and has a key AK (referred to as an arming key AK) for operating the anti-theft function of the system and a key DAK (referred to as a disarming key) for clearing the operation state of the anti-theft function.

The control unit 101 and the transceiver unit 102 in the motor vehicle telephone system MTS are interconnected by means of a plurality of power control lines, a plurality of digital data exchange lines, voice signal lines etc., and the T-connector 103 connects some of the lines required in connection with the anti-theft system MSP. A total of three lines which are a power control line, data transmitting line, and a data receiving line are connected via the T-connector 103 to the control section 203 of the steal-proof system MSP.

Figure 4:
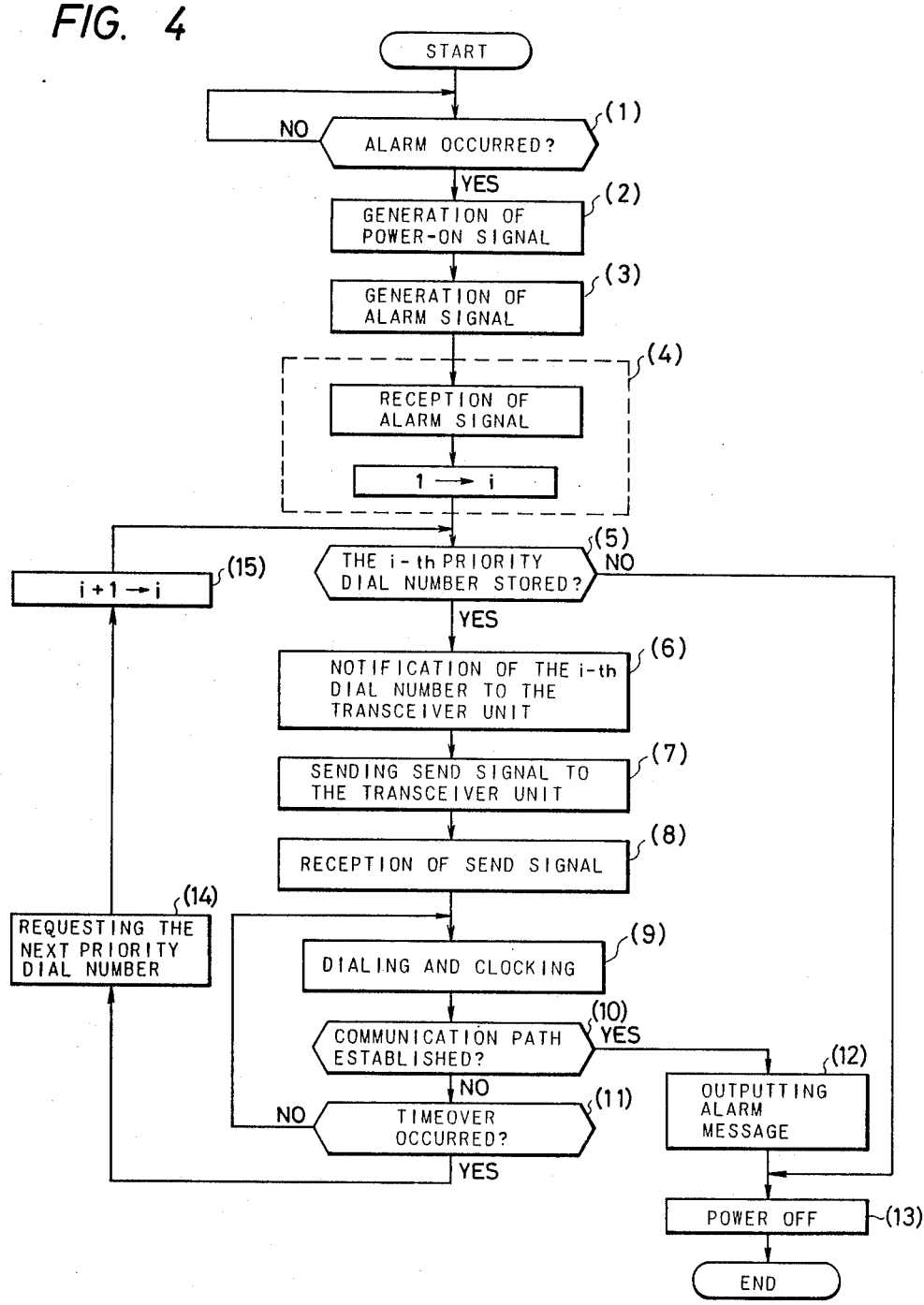
FIG. 4 is a flow chart of the processing for the system in accordance with the present invention.

The descriptions of the theft notifying method are provided below with reference to the flow chart in FIG. 4.

A telephone number of a notifiee, to which an anti-theft alarm is to be sent in case of theft, is stored in a memory of the control unit 101 in advance for example. More specifically, a telephone number is input by pressing numeric keys of the ten-key section 101d-1 of the handset HDS (FIG. 3), then the telephone number is stored into the memory (RAM) of the control section 101a by pressing the store key STO of the function key section 101d-2. The following description assumes that several telephone numbers can be stored into the RAM in the priority order.

Before a driver leaves a car, he/she sets the anti-theft system MSP to the operating state by pressing a predetermined key on the operating section 202. The setting can be completed after the vehicle is locked by operating the arming key AK on the remote control unit (pager) 204 outside the vehicle. It is noted here that the power-on/off switch PW of the motor vehicle telephone system MTS (FIG.2) may be at the ON position. However, the following description is made assuming that the switch is set at the OFF position.

(1) With these arrangements, when someone opens a vehicle door or opens a trunk door or gives a strong shock to a vehicle during a theft activity or when noises inside the vehicle become exceed a predetermined level, at least one of the sensors of the sensor section 201 detects the abnormality to notify the control section 203.

(2) When the control section 203 is notified of the abnormality by the sensor 201, it outputs a power-enabling signal (a high-level signal) via the power control line. Then, the control unit 101 causes the motor vehicle telephone system MTS to be set to the power-on state in the same manner as the power switch PW (FIG, 2) is turned on.

(3) Then, the control section 203 of the anti-theft system MSP forwards an alarm signal notifying of a theft occurrence to the motor vehicle telephone system MTS via the transmit line.

(4) The control unit 101 of the motor vehicle telephone system executes the processing of 1→i when it receives the alarm signal indicating the abnormality.

(5) The control section 101a of the control unit 101 checks whether a telephone number of i-th priority has been stored in the RAM.

(6) If the telephone number of the i-th priority has been stored, the control section 101a forwards the telephone number to the transceiver unit 102 in the same manner as normal dialing operation.

(7) After forwarding the telephone number, the control section 101a automatically generates a SEND signal and it also forwards this signal to the transceiver unit 102. It is noted that the SEND signal in the normal dialing operation is forwarded from the control unit 101 to the transceiver unit 102 after inputting a telephone number by pressing the send key SEND.

(8) The transceiver unit 102 will be in the wait state until it receives the SEND signal.

(9) Upon reception of the SEND signal, the transceiver unit 102 dials the telephone number of the notifiee and starts clocking.

(10) The control section 102e of the transceiver unit 102 checks whether the recipient is in the communication state with a handset off-hooked.

(11) The transceiver unit 102 continues clocking when the communication state is not established and checks whether the clocking time exceeds a pre-determined time. It continues dialing until the time is over.

(12) When the communication state is established before the timeover, the control section 102e of the transceiver unit 102 activates the alarm message output device 102f to send an alarm message to the notifiee. It should be noted that the alarm message will be a sound of a pre-determined tone when the alarm message output device 102f has a sound generator. If the alarm message output device is a synthesizer having a voice synthesizing function, the message will be a recorded alarm by saying, for example, "Emergency on your car ... ".

(13) After sending the alarm message, the transceiver unit 102 turns off the power for the motor vehicle telephone system MTS and completes the theft notifying process.

(14) On the other hand, when timeover occurs in the step (11), the transceiver unit 102 requests the control unit 101 to send a notification of the next priority telephone number.

(15) The control section 101a of the control unit 101 performs the processing of i+1→i to repeat the steps (5)–(14). In case of the absence of the i-th priority telephone number in the RAM at the step (5), the control section 101a performs steps (13)–(14), that is, the power-off processing to complete the theft alarm notifying process.

The above description is for a case where a plurality of notifiees' telephone numbers are stored in priority order in a memory and a lower priority telephone number cannot be accessed because of the absence of a corresponding notifiee, for example. However, it is of course possible to utilize a system configuration in which only one telephone number is stored. In this case, steps (5), (11), and (15) in the flow chart in FIG. 4 are not required, and the process may be skipped to the step (13) if timeover occurs in the step (13).

The above description is directed to the case where telephone numbers are stored in the memory of the control unit 101. Apparently, another system configuration may be applied, wherein each telephone number is stored in the memory of the anti-theft system and the telephone number is forwarded to the motor vehicle telephone system when an abnormality occurs.

An alarm message output device which is provided to the transceiver unit 102, could be optionally provided to the control unit 101.

What is claimed is:

1. A method for notifying a notifiee of an abnormality occurring in a vehicle which is equipped with a vehicle telephone system and an anti-theft system for detecting abnormal conditions occurring at the vehicle, comprising:

providing an operative connection between the telephone system and the anti-theft system so that the anti-theft system can provide a power-on signal and an alarm signal to the telephone system;

placing the anti-theft system is an armed mode and the telephone system in a power-off mode when the vehicle owner leaves the vehicle;

operating the anti-theft system in the armed mode so that it provides the power-on signal and the alarm signal through the operative connection to the telephone system when the anti-theft system detects an abnormal condition;

operating the telephone system so that upon receipt of the power-on signal it switches to a power-on mode;

storing in advance in a memory of the telephone system a telephone number of a notifiee to be called in the event of an abnormal condition occurring at the vehicle;

operating the telephone system so that upon receipt of the alarm signal from the anti-theft system and switching to the power-on state, the telephone number of the notifiee is recalled from memory, and the telephone number is dialed to establish a communication state with the notifiee.

2. A method as set forth in claim 1, wherein the telephone numbers of a plurality of notifiee are stored in the memory in priority order, the method further comprising calling dialing a telephone number of lower priority when a communication between a desired priority telephone number is not established within a predetermined period of time.

* * * * *

UNITED STATES PATENT AND TRADEMARK OFFICE
CERTIFICATE OF CORRECTION

PATENT NO.   : 4,821,309

DATED        : April 11, 1989

INVENTOR(S)  : Makoto Namekawa

It is certified that error appears in the above-identified patent and that said Letters Patent is hereby corrected as shown below:

In the Claims

Col. 5, line 30, delete "vehicle", second occurrence;

Col. 5, line 31, after "telephone system" insert --switchable on/off with a power source--;

Col. 6, line 5, "is" should be --in--.

Signed and Sealed this

Twenty-seventh Day of March, 1990

Attest:

JEFFREY M. SAMUELS

*Attesting Officer*   Acting Commissioner of Patents and Trademarks